No. 698,524. Patented Apr. 29, 1902.
J. A. LAMONT.
BRAKE BEAM.
(Application filed Feb. 15, 1900.)
(No Model.)
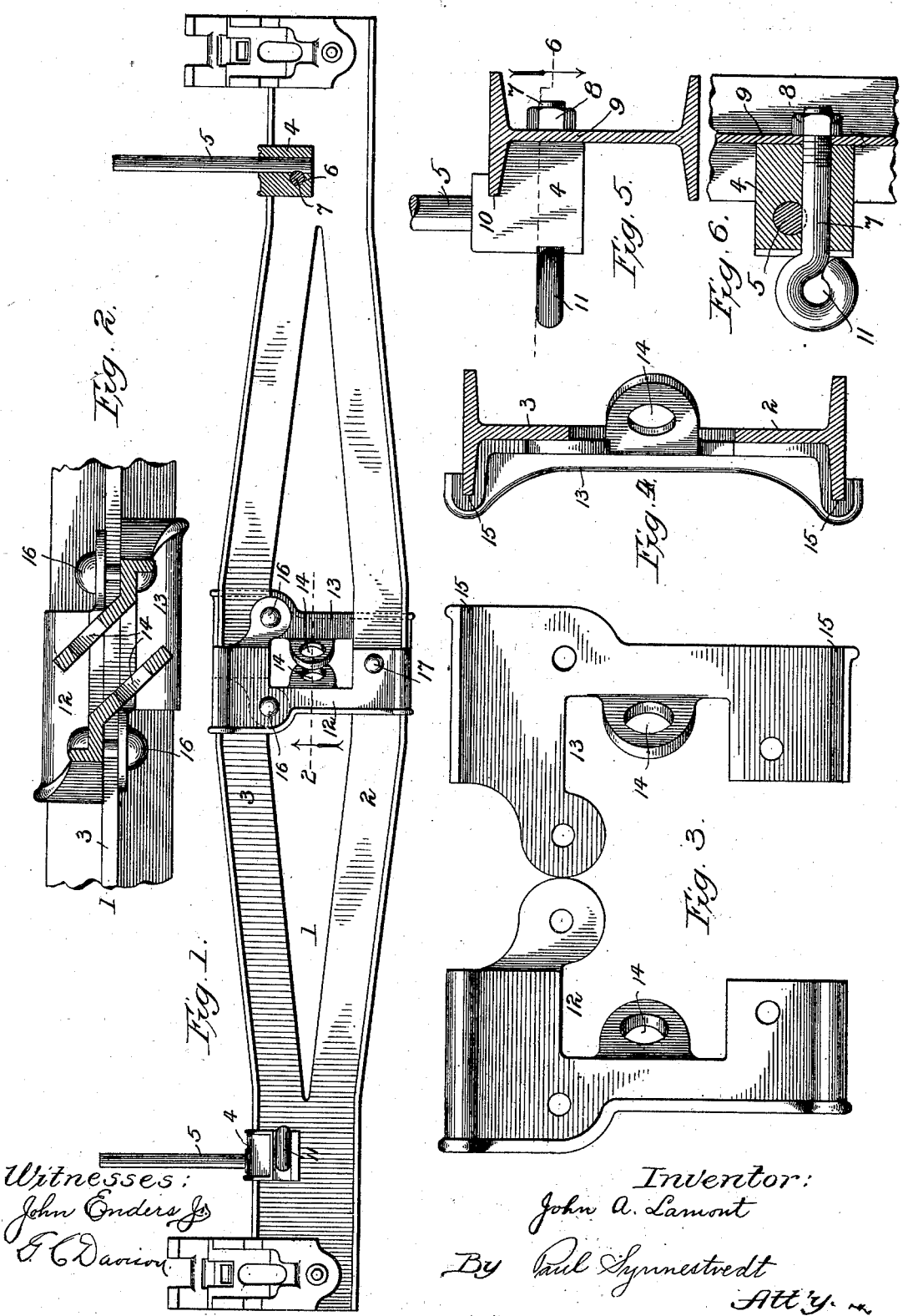
Witnesses:
John Enders Jr
T. C. Davion
Inventor:
John A. Lamont
By Paul Synnestvedt
Att'y

UNITED STATES PATENT OFFICE.

JOHN A. LAMONT, OF HAMMOND, INDIANA, ASSIGNOR TO THE SIMPLEX RAILWAY APPLIANCE COMPANY, OF CHICAGO, ILLINOIS, A CORPORATION OF ILLINOIS.

BRAKE-BEAM.

SPECIFICATION forming part of Letters Patent No. 698,524, dated April 29, 1902.

Application filed February 15, 1900. Serial No. 5,288. (No model.)

*To all whom it may concern:*

Be it known that I, JOHN A. LAMONT, a citizen of the United States, residing in Hammond, Lake county, Indiana, have invented a new and useful Improvement in Brake-Beams, of which the following, taken in connection with the accompanying drawings, is a specification.

The first of the objects of my invention is the construction of a brake-beam made, preferably, of a suitable structural shape and provided with an improved fulcrum-post and wheel-guard, both of the said improved parts being so designed and arranged as to secure a beam of simplicity, strength, and lightness and one which will be cheap to manufacture and easy to repair.

A further object of my invention is the provision of a beam comprising a member having a web and one or more flanges and a wheel-guard socketed in a casting secured to said member by a bolt or pin engaging a notch or equivalent irregularity in said guard, whereby the same is prevented from getting out of place in its socket.

Another object of my invention is the combination, with a beam having a compression and tension member spaced apart near their middle portion, of a fulcrum-post composed of two parts attached to the said members, one on each side thereof, but in position so that the hole for the fulcrum-pin in each part registers properly with the other. In the manufacture of the said two parts which comprise the fulcrum-post I prefer to make them so that they lap over or embrace the two members at the edges thereof and to secure them in position by rivets arranged so as not to weaken the tension member.

A better idea of my invention can now be obtained by an examination of the accompanying drawings, illustrating the same in preferred form, in which—

Figure 1 is a plan view showing a beam embodying my invention. Fig. 2 is a section on the line 2 2 of Fig. 1. Fig. 3 is a plan view showing the two parts of the fulcrum-post separated from each other. Fig. 4 is a sectional view showing one part of the fulcrum-post entire. Fig. 5 is a sectional view showing the method of securing the wheel-guard, and Fig. 6 is a view taken on the line 6 6 of Fig. 5.

In carrying out my invention I first take a piece, preferably of an ordinary commercial shape—such, for example, as an I-beam—and using the same as the main member 1 of the beam split it intermediate its flanges and spread the two split portions apart to form the compression member 2 and the tension member 3. At the proper distance from the ends of said member I provide an anchor-block 4, within which is socketed a wheel guard or rod 5, which is provided with a notch 6, engaged by a bolt 7, which passes through the anchor-block 4, and by means of the nut 8 holds the anchor-block in fixed relation to the web 9, the block being more securely retained in position, especially as against any rotative movement, by a notch therein, 10, which bears against one of the flanges of the main member. The bolt 7 is provided with an eye or suspension-head 11, designed to receive the chain or hook which supports the beam.

The fulcrum-post is composed of two parts 12 and 13, constructed as shown in Fig. 3, and placed on the beam, as shown in Fig. 1, in such position that the fulcrum-pin holes 14 are in proper register. The two parts 12 and 13 are constructed with notches 15, designed to engage one or both of the flanges of the main member of the beam, so as to aid in holding the several parts together, and in order to avoid weakening of the tension member 3 to any material extent the rivets 16 are placed so as to cut away the metal of the said tension member little, if at all, as clearly shown in Fig. 1. Through the compression member another rivet 17 is used to secure the other ends of the two parts of the fulcrum-post. As will be seen, the parts of the fulcrum-post, while fitting the opposite sides of the beam, do not contact with each other. There is therefore no tendency of a snapping of bolt or rivet heads due to any excessive pressure which might be placed on the beam, and a closer fit is thereby obtained with the flange and web portions.

Having thus described my invention, what I claim as new, and desire to secure by Letters Patent, is—

1. A metallic brake-beam comprising the combination with a compression and tension member having a web provided with flanges at the edge thereof, of a fulcrum-post composed of two halves disposed on opposite sides of said members out of contact with each other and forming an interposed central strut therefor and having notches engaging said flanges, and means for securing the said parts together and in position upon the said compression and tension members, substantially as described.

2. A metallic brake-beam comprising the combination with a compression and tension member having flanges, of a fulcrum-post composed of two halves disposed on opposite sides of said members out of contact with each other, and forming an interposed central strut therefor, said halves being duplicates of each other, and having notches engaging said flanges, and means for securing the said parts together and in position upon the said compression and tension members, substantially as described.

3. A brake-beam comprising a main member provided with a web and flange, an anchor-block 4 mounted on the upper side of said web and adjacent to the forward flange thereof, a wheel-guard 5 socketed in said anchor-block, a bolt 7 securing said block to the web of the main member and engaging said guard at right angles so as to secure the same against movement relative to the anchor-block and without contact with the flange, said anchor-block having a notch 10 therein engaging the flange of the main member, substantially as and for the purpose described.

JNO. A. LAMONT.

Witnesses:
   PETER DILSCHNEIDER,
   JAMES K. STINSON.